Figure 2:
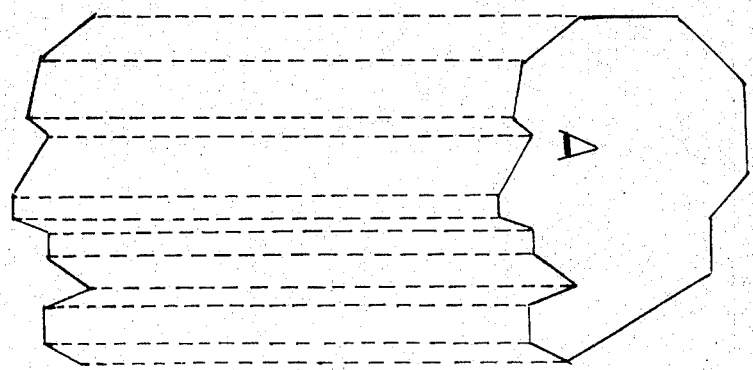

United States Patent [19]
Frank

[11] 3,721,008
[45] March 20, 1973

[54] MARKER AND TRACKING ARM

[76] Inventor: Eugene P. Frank, 350 East St. James St., San Jose, Calif. 95112

[22] Filed: Oct. 26, 1971

[21] Appl. No.: 192,467

[52] U.S. Cl. ................................. 33/41 E, 33/23 B
[51] Int. Cl. ........................................... B43l 13/16
[58] Field of Search ....33/41 E, 41 F, 42, 23 B, 18 R, 33/20 R

[56] References Cited

UNITED STATES PATENTS

| | | | |
|---|---|---|---|
| 2,588,757 | 3/1952 | Pepples | 33/41 F |
| 2,968,098 | 1/1961 | Collin | 33/41 E |
| 1,846,528 | 2/1932 | Santin | 33/41 E |
| 3,316,643 | 5/1967 | Wenzel | 33/20 C |
| 805,187 | 11/1905 | Daly | 33/20 C |

*Primary Examiner*—Harry N. Haroian

[57] ABSTRACT

The marker and tracking arm is in general a pen or pencil with an arm extending from it with a tracking point that, due to the influence of gravity, follows an identical track as the marker point.

1 Claim, 2 Drawing Figures

PATENTED MAR 20 1973 3,721,008

Eugene P. Frank

MARKER AND TRACKING ARM

My invention, a marker and tracking arm, relates generally to free-hand copying devices. Specifically, my invention relates to free-handed devices where a pencil or pen, when moved, causes a remote tracking point to move along a similar or identical path or track, the pen or pencil being moved free-handed is such a way as to cause the tracking point to trace or track the drawing or other subject matter being copied causing an identical or similar delineation or copying by the pen or pencil. Such devises use same form of direct mechanical linkage. My invention uses no direct mechanical linkage so to speak, but instead, utilizes a free-floating counterbalanced arm held in a constant attitude (relative to ground) by the influence of gravity, this influence of gravity bringing about the true tracking of the pen or pencil point and the tracking point. My invention though, must be used on a reasonably vertical flat surface. Also, my invention takes a reasonably steady hand to operate, as any jerky movements cause the free-floating counterbalanced (tracking) arm to oscillate. Thus, the real advantage of my invention over the other devises, is its simplicity. It is simple to manufacture; it is simple to set up for use; and it is simple to use if used gently. Of course, as with some of the other devises, my invention may be used to delineate subject matter directly from life by allowing the tracking point to extend over the edge of a vertical flat surface, and sighting it (tracking point to subject-matter) along the imaginary extension of said vertical flat surface.

Figure 1:
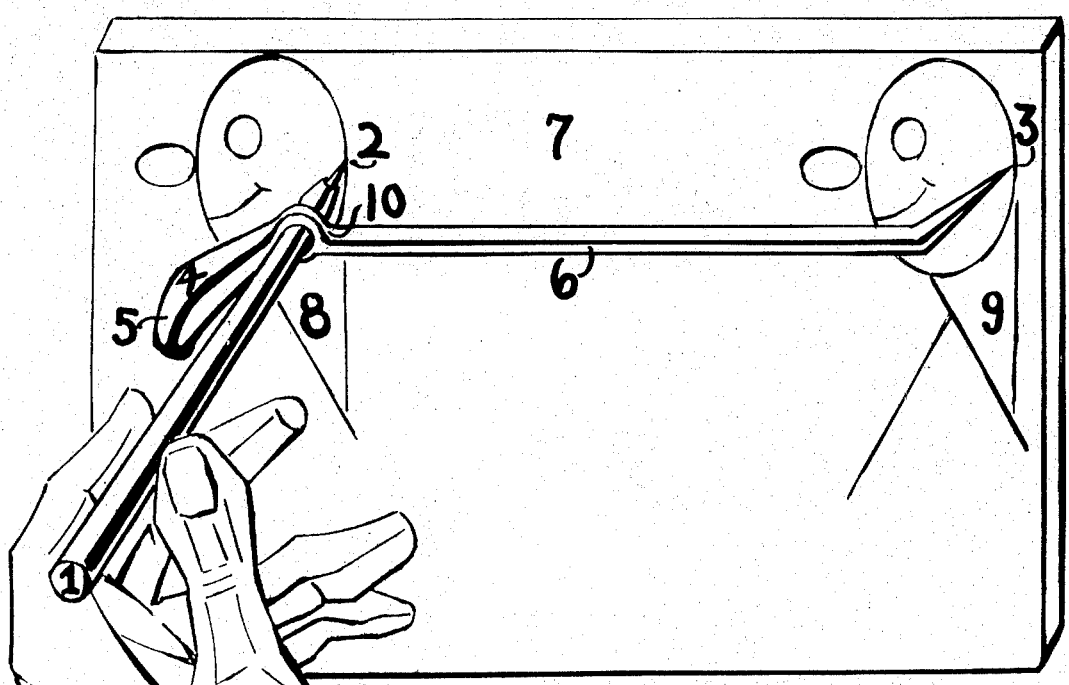

FIG. 1 represents the marker and tracking arm in operation. In FIG. 1; 4 is the counterweighted tracking arm, 6 is the tracking arm, 5 is the counterweight, 3 is the tracking point, 10 is the pivot bearing, 1 is the marker, 2 is the marker point, 7 is the vertical (flat) surface, 9 is the subjectmatter (a cartoon) being tracked, 8 is the almost complete delineation of 9, the subject matter being tracked.

FIG. 2, intended as a Visual Aid, represents an image of a man on the right, having been partially delineated on the left, the dotted lines representing momentary positions of the tracking arm. All the dotted lines are parallel and of the same length.

In FIG. 1, the counterweighted tracking arm 4, at pivot point 10, hangs at a predetermined attitude in relationship to the ground (pivoting at a right angle) on central axis of marker 1 emanating from marker point 2. By "to hang" I mean that there is more weight below, than above pivot point, so that under the influence of gravity, said counterweighted tracking arm 4. establishes a single natural bottom-heavy state of equilibrium thus maintaining a constant attitude in relationship to ground. The attitude of counterweighted tracking arm 4 in FIG. 1 is predetermined by the designed distribution and amount of weight in the counter-balanced tracking arm 4 in relationship to pivot bearing 10.

FIG. 2, a visual aid, makes the theory of operation of the marker and tracing arm in FIG. 1 obvious. The dotted or broken lines representing momentary positions of a tracking arm would have to be parallel to each other if the attitude of the tracking arm remained constant. The length of the dotted lines of course is determined by the length of the tracking arm which does not change. Now, let the dotted or broken lines in FIG. 2 be considered as the axis between marked point 2, and tracking point 3 in FIG. 1.

In operation, the tracking point 3 in FIG. 1 must not be allowed to drag on the vertical surface 7 in FIG. 1, as this would upset the equilibrium of tracking arm 6 in FIG. 1. To be specific, marker point 2 in FIG. 1 is in contact with, and tracking point 3 in FIG. 1 is in close proximinity of or barely touching said vertical surface 7 in FIG. 1. Marker 1 in FIG. 1 may be a pen or pencil or other marking devise.

I claim:

1. A training device comprising in combination: a marker, a marker point, said marker terminating in said marker point, a counterweighted tracking arm, a tracking point, said counterweighted tracking arm terminating in said tracking point and including a counterweight at the intermediate end of said arm, a pivot bearing on said arm untermediate said tracking point and counterweight said pivot bearing encircling said marker so that said tracking arm maintains a horizontal attitude.

* * * * *